United States Patent [19]

Heeks

[11] 4,222,637
[45] Sep. 16, 1980

[54] ELECTRIC OPTIC SWITCH

[75] Inventor: John S. Heeks, Harlow, England

[73] Assignee: International Standard Electric Corporation, New York, N.Y.

[21] Appl. No.: 890,551

[22] Filed: Mar. 20, 1978

[30] Foreign Application Priority Data

Mar. 31, 1977 [GB] United Kingdom ............... 13600/77

[51] Int. Cl.² .............................................. G02F 1/29
[52] U.S. Cl. ................................................... 350/356
[58] Field of Search .................... 331/94.5 K, 94.5 M, 331/94.5 C; 350/96.13, 356

[56] References Cited

U.S. PATENT DOCUMENTS 3,320,013  5/1967  Johnson .......................... 331/94.5 C Primary Examiner—William L. Sikes
Attorney, Agent, or Firm—John T. O'Halloran; Peter C. Van Der Sluys

[57] ABSTRACT

A solid state electro-optic switch employing first order electro-optic effect in bulk material. Selectively energized contact patterns define divergent optical waveguide paths in the bulk material.

7 Claims, 2 Drawing Figures

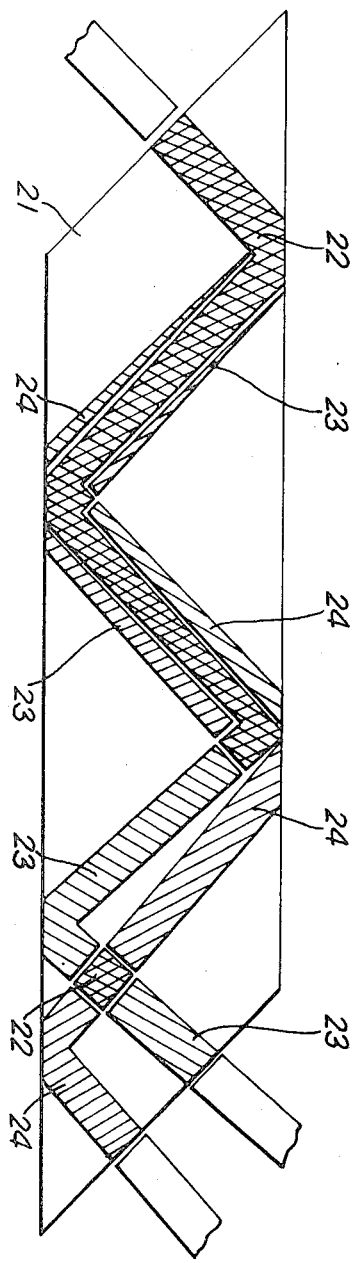
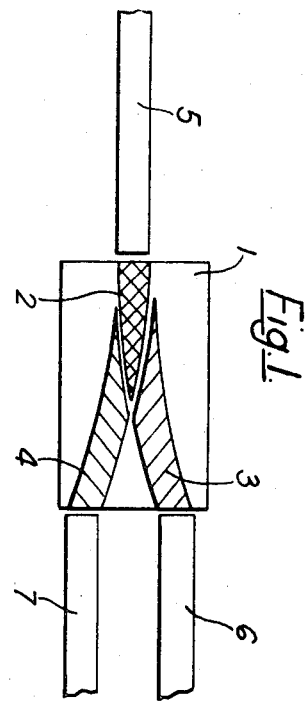

ELECTRIC OPTIC SWITCH

BACKGROUND OF THE INVENTION

This invention relates to electro-optic switch devices for switching optical signals from an input between a pair of outputs, analogues to a single pole changeover switch for electrical signals.

According to the invention, there is provided an electro-optic material, said body having at least two plane opposing faces and two plane end faces normal to said opposing faces, at least one of said opposing faces being provided with a number of electrical contact patterns which in selected combinations combine to define at least two tangentially divergent paths having a common origin, said paths at their ends being substantially normal to the end faces, the other of said opposing faces having electrical contact means thereon whereby an electric field may be applied to the body between a selected combination of electrical contact patterns on the one opposing face and the electrical contact means on the other opposing face.

Embodiment of the invention will now be described with reference to the accompanying drawings, in which:

BRIEF DESCRIPTION OF THE DRAWINGS

FIG. 1 illustrates a simple electro-optic switch according to the invention, and FIG. 2 illustrates a more complex switch employing multiple internal reflections.

DESCRIPTION OF THE PREFERRED EMBODIMENT

In the arrangement shown in FIG. 1 a rectangular body of electro-optic material 1, e.g. lithium niobate, has a set of metal contact patterns 2, 3 and 4 deposited on one longitudinal face (the "top" face). The opposing ("bottom") face either has a corresponding set of metal patterns or a metal ground plane thereon. Optical fibers 5, 6 and 7 have their ends aligned with the ends of optical paths defined in the body when an electric field is applied thereto by connecting the metal contacts on the top and bottom faces to a voltage source. If the electric field is applied via contacts 2 and 3 only on the top face and corresponding contacts on the bottom face (or the ground plane, whichever is the case) the resulting electro-optic effect forms the equivalent of an optical waveguide within the body, the shape of the waveguide following the shape of the contacts 2 and 3. Thus light entering the body 1 from the fibre 5 is guided through the body to emerge opposite the end of fibre 6. If now the electrical connections are changed from contacts 2 and 3 to contacts 2 and 4 a new waveguide path is defined, the light emerging opposite the end of fibre 7.

In practice contact 2, being common to both light paths, is left permanently connected to the voltage source while the electrical switching is confined to contacts 3 and 4 only. The allowable curvature of the contacts 3 and 4 is dependent on the effective change in refracted index in the bulk material. Although mention has been made only of metal contacts on lithium niobate other structures are envisaged, e.g. Schottky barrier depletion strips on a body of semiconductor materials.

The principal difficulty with the configuration of FIG. 1 is that for a reasonable field the change in refractive index $\Delta n$ is small, the permissible radius of curvature is therefore large and the device must be physically fairly long to achieve separation of paths. To overcome this, the configuration of FIG. 2 utilizes multiple reflections within the body to double cumulatively the incremental electro-optic deflections. The contacts 22 are common to both paths and are permanently connected to the voltage source while the contacts 23 and 24 are alternatively connected to the voltage source to effect the optical switching. It should be noted that in fact the sides of the contacts would normally be arcs of circles of large radius, not straight lines as drawn in the figure for the sake of simplicity. The end faces of the body 21 are of necessity angled with respect to the side faces of the body to introduce the required internal reflections, though these end faces are, of course, normal to the top and bottom faces.

Electro-optic switches according to the invention combine the features of electro-optical activation and waveguide configuration. The switch illustrated in FIG. 2 also includes the feature of passive amplification.

What is claimed is:

1. An electric-optic switch, comprising: a body of electro-optic material, said body having at least two plane opposing faces and two plane end faces normal to said opposing faces, at least one of said opposing faces being provided with a number of electrical contact patterns which in selected combinations combine to define at least two tangentially divergent paths having a common origin, said paths at their ends being substantially normal to the end faces, the other of said opposing faces having electrical contact means thereon whereby an electric field may be applied to the body between a selected combination of electrical contact patterns on the one opposing face and the electrical contact means on the other opposing face to define an optical path between the contact patterns and the contact means.

2. A switch according to claim 1, wherein the electrical contact means on the other opposing face comprises a number of electrical contact patterns corresponding to those on the one opposing face.

3. A switch according to claim 2, wherein the body is a semiconductor and the electrical contacts are Schottky barrier depletion strips.

4. A switch according to claim 1, wherein the body is a semiconductor and the electrical contacts are Schottky barrier depletion strips.

5. An electric-optic switch, comprising:
a body of lithium niobate having at least two plane opposing faces and two plane end faces normal to said opposing faces, at least one of said opposing faces being provided with a number of metal electrical contact patterns which, in selected combinations combine to define at least two tangentially divergent paths having a common origin, said paths at their ends being substantially normal to the end faces, the other of said opposing faces having electrical contact means thereon whereby an electric field may be applied to the body between a selected combination of electrical contact patterns on the one opposing face and the electrical contact means on the other opposing face to define an optical path between the contact patterns and the contact means.

6. A switch according to claim 5, wherein the electrical contact means on the opposing face comprises a number of metal electrical contact patterns corresponding to those on the one opposing face.

7. An electric-optic switch, comprising:

a body of electro-optic material, said body having at least two plane opposing faces, two plane end faces normal to said opposing faces and two side faces angled with respect to the end faces and normal to the opposing faces, at least one of said opposing faces being provided with a number of electrical contacts, said contacts being formed and arranged on said one opposing face to define at least two diverging zigzag paths having a common origin at an edge of one of said end faces, said paths extending in directions substantially normal to said edge towards an edge of one of said side faces and thereafter extending towards an edge of the other of said side faces and continuing therefrom extending between the edges of said side faces until said paths are separated and reach an edge of one of the other of said end faces at two separated locations, the other of said opposing faces having electrical contact means thereon whereby an electrical field may be applied to the body between a selected combination of electrical contacts on the one opposing face and the electrical contact means on the other opposing face to define an optical path between the selected electrical contacts and the contact means, whereby optical paths through the body are defined by the selected electrical contacts and contact means including a plurality of internal reflections at the side faces.

* * * * *